United States Patent
Yoshioka et al.

(10) Patent No.: US 10,975,779 B2
(45) Date of Patent: *Apr. 13, 2021

(54) ENGINE SYSTEM FOR DETERMINING ABNORMALITIES IN AN EXHAUST GAS RECIRCULATION VALVE

(71) Applicant: AISAN KOGYO KABUSHIKI KAISHA, Obu (JP)

(72) Inventors: Mamoru Yoshioka, Nagoya (JP); Masanao Kurita, Toyoake (JP); Masateru Nagao, Ichinomiya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,841

(22) Filed: Apr. 4, 2019

(65) Prior Publication Data
US 2019/0345882 A1 Nov. 14, 2019

(30) Foreign Application Priority Data
Mar. 13, 2018 (JP) ................................ 2018-046014

(51) Int. Cl.
*F02D 41/00* (2006.01)
*F02D 21/08* (2006.01)
*F02D 41/12* (2006.01)

(52) U.S. Cl.
CPC ............ *F02D 21/08* (2013.01); *F02D 41/123* (2013.01); *Y02T 10/40* (2013.01)

(58) Field of Classification Search
CPC .... F02D 21/08; F02D 41/123; F02D 41/0077; F02D 2041/0017; Y02T 10/47; Y02T 10/144; F02M 26/06; F02M 26/49
See application file for complete search history.

(56) References Cited

U.S. PATENT DOCUMENTS 6,978,602 B2 * 12/2005 Ohtake ................. F02D 41/029
                                                             60/285
9,222,441 B2 * 12/2015 Yoshioka ............ F02D 41/0077
(Continued)

FOREIGN PATENT DOCUMENTS

JP          2008-223516 A     9/2008

OTHER PUBLICATIONS

Nov. 20, 2018 Office Action issued in Japanese Patent Application No. 2018-046014.

*Primary Examiner* — Gonzalo Laguarda
(74) *Attorney, Agent, or Firm* — Oliff PLC

(57) ABSTRACT

An engine system includes a throttle device, an EGR valve, and an ECU. The ECU diagnoses foreign-matter lodging abnormality of the EGR valve and the foreign-matter diameter based on intake pressure. When the existence of the abnormality and the foreign-matter diameter are determined, the ECU calculates a difference between a foreign-matter diameter and a predetermined learning determination value as a foreign-matter diameter difference. If this difference is larger than an abnormality determination value, the foreign-matter diameter is judged to be excessive and the throttle device is controlled to avoid engine stall. If the foreign-matter diameter difference is equal to or larger than a normality determination value and also equal to or less than the abnormality determination value, engine deceleration is continued. If the foreign-matter diameter difference is less than the normality determination value, the foreign-matter diameter is judged to be minute and the learning determination value is updated.

3 Claims, 9 Drawing Sheets

(56) References Cited

U.S. PATENT DOCUMENTS

| | | | | |
|---|---|---|---|---|
| 9,574,526 B2* | 2/2017 | Takaki | | F02D 21/08 |
| 10,393,044 B2* | 8/2019 | Ito | | F02D 41/0235 |
| 2018/0128192 A1* | 5/2018 | Sugiyama | | F02M 26/64 |
| 2018/0283326 A1* | 10/2018 | Miura | | F02M 26/49 |
| 2019/0293007 A1* | 9/2019 | Yoshioka | | F02D 41/0005 |
| 2019/0338717 A1* | 11/2019 | Nagao | | F02M 26/19 |

* cited by examiner

ENGINE SYSTEM FOR DETERMINING ABNORMALITIES IN AN EXHAUST GAS RECIRCULATION VALVE

CROSS-REFERENCE TO RELATED APPLICATIONS

This application is based upon and claims the benefit of priority from the prior Japanese Patent Application No. 2018-046014 filed on Mar. 13, 2018, the entire details of which are incorporated herein by reference.

BACKGROUND

Technical Field

The technique disclosed in the present disclosure relates to an engine system provided with an exhaust gas recirculation device (including an exhaust gas recirculation valve) to allow part of exhaust gas of an engine to recirculate as an exhaust recirculation gas into the engine, and configured to execute during-deceleration engine-stall avoidance control when the exhaust gas recirculation valve is determined to be abnormal in valve full-closing operation during deceleration of the engine.

Related Art

As the above type of technique, heretofore, there has been known for example a technique disclosed in Japanese unexamined patent application publication No. 2008-223516 (JP 2008-223516A), titled "Failure diagnosis device of an exhaust gas recirculation apparatus for engine". This art includes an EGR passage connecting an intake passage and an exhaust passage of the engine, an EGR supply unit including an EGR valve placed in the EGR passage, an airflow meter for detecting the amount of air to be sucked in the engine, an intake pressure sensor for detecting an intake pressure, an intake pressure estimating unit for estimating the intake pressure based on the detected intake amount, an EGR failure determining unit for causing the EGR valve to open during deceleration and performing a failure determination of the EGR supply unit a foreign-matter lodging determination of the EGR valve) based on a relationship between the intake pressure estimated as above (the estimated intake pressure) and the intake pressure detected as above (the detected intake pressure), and a learning unit for correcting a deviation between the estimated intake pressure and the detected intake pressure at idle. The EGR failure determining unit is configured to perform failure determination by reflecting a learning value corrected by the learning unit. Herein, the learning unit is configured to learn in advance a correction value related to the deviation between the estimated intake pressure and the detected intake pressure, at idle substantially similar to during deceleration (i.e., when a throttle valve is nearly fully closed). Thus, the present apparatus promptly executes failure diagnosis during deceleration while maintaining learning accuracy of the correction value.

SUMMARY

Technical Problem

In the art disclosed in JP 2008-223516A, however, detection results of intake pressure by the intake pressure sensor and detection results of intake amount by the airflow meter are continually subjected to various influences and thus the accuracy of failure determination based on those detection values may deteriorate, leading to erroneous decision. Herein, various influences on the detection of an operating state of an engine may include for example abrupt changes in condition, such as engine internal EGR, atmospheric pressure, and intake-air temperature, and also include an increase in intake pressure during braking or during purging in a vehicle.

The present disclosure has been made to address the above problems and has a purpose to provide an engine system capable of preventing erroneous determination for the abnormality that an exhaust gas recirculation valve could not be completely brought into a fully-closed state because of foreign-matter lodging or the like and properly avoiding engine stall when the abnormality occurs, irrespective various influences on the detection of an engine operating state.

Means of Solving the Problem

To achieve the above purpose, one aspect of the present disclosure provides an engine system comprising: an engine; an intake passage configured to introduce intake air into the engine; an exhaust passage configured to discharge exhaust gas from the engine; an exhaust gas recirculation device including: an exhaust gas recirculation passage configured to allow part of the exhaust gas discharged from the engine to the exhaust passage to flow as an exhaust recirculation gas into the intake passage to recirculate into the engine; and an exhaust gas recirculation valve configured to regulate an amount of the exhaust recirculation gas in the exhaust gas recirculation passage, the exhaust gas recirculation valve including a valve seat and a valve element provided to be capable of seating on the valve seat; an output adjusting unit configured to adjust output of the engine; an operating-state detecting unit configured to detect an operating state of the engine; and a controller configured to control at least the exhaust gas recirculation valve and the output adjusting unit based on the detected operating state of the engine, wherein the controller is configured to diagnose abnormality in opening/closing between the valve seat and the valve element in the exhaust gas recirculation valve and a level of the abnormality based on the detected operating state during deceleration of the engine, when existence of the abnormality and the abnormality level are determined, the controller is configured to calculate a difference between the abnormality level and a predetermined learning determination value as an abnormality level difference, when the abnormality level difference is larger than a predetermined abnormality determination value, the controller is configured to judge that the abnormality level is excessive and control the output adjusting unit to avoid engine stall, when the abnormality level difference is equal to or larger than a predetermined normality determination value smaller than the abnormality determination value and the abnormality level difference is equal to or less than the abnormality determination value, the controller is configured to continue deceleration of the engine, and when the abnormality level difference is less than the normality determination value, the controller is configured to judge that the abnormality level is minute and update the learning determination value.

According to the present disclosure, it is possible to prevent erroneous determination for the abnormality that an exhaust gas recirculation valve could not be completely brought into a fully-closed state because of foreign-matter lodging or the like and properly avoid engine stall when the abnormality occurs, irrespective various influences on detection of an engine operating state.

DETAILED DESCRIPTION OF THE EXEMPLARY EMBODIMENTS

A detailed description of an embodiment of an engine system of this disclosure embodied into a gasoline engine system will now be given referring to the accompanying drawings.

(Outline of Engine System)

Figure 1:
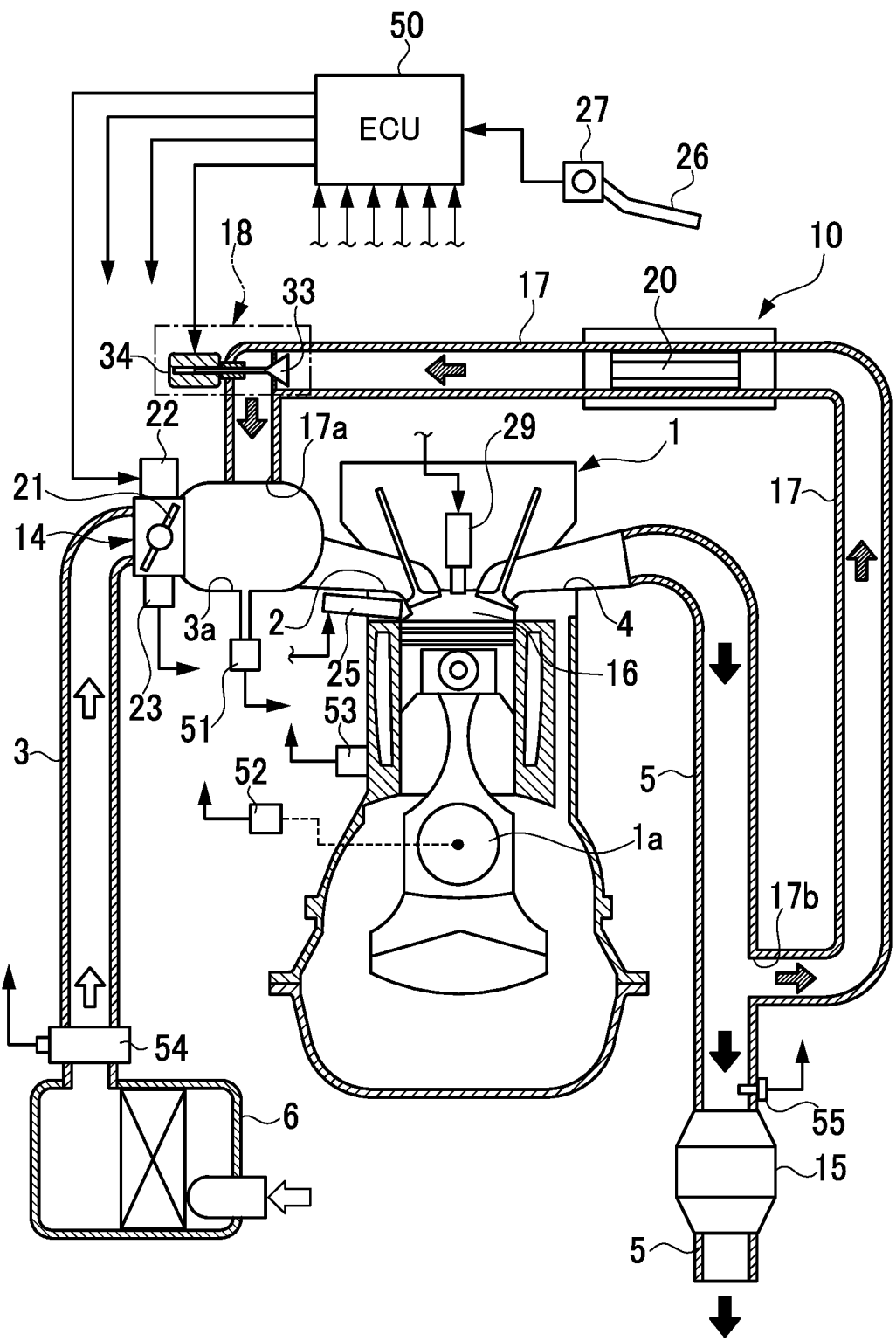
FIG. 1 is a schematic configuration diagram of a gasoline engine system in an embodiment.

FIG. 1 is a schematic configuration diagram showing a gasoline engine system (hereinafter, simply referred to as an "engine system") in the present embodiment. This engine system is provided with a reciprocating 4-cylinder engine 1. This engine 1 includes an intake port 2 connected to an intake passage 3 and an exhaust port 4 connected to an exhaust passage 5. At an inlet of the intake passage 3, an air cleaner 6 is provided.

In the intake passage 3, a surge tank 3a is provided and, upstream of the surge tank 3, an electronic throttle device 14 is placed. The electronic throttle device 14 includes a throttle Valve 21, a DC motor 22 to drive the throttle valve 21 to open and close, and a throttle sensor 23 to detect an opening degree TA of the throttle valve 21 (i.e., a throttle opening degree). The electronic throttle device 14 is configured such that the opening degree of the throttle valve 21 is adjusted by driving of the DC motor 22 according to an accelerator pedal 26 operated by a driver. The electronic throttle device 14 corresponds to one example of an output adjusting unit in the present disclosure. In the exhaust passage 5, a catalytic converter 15 is provided to clean exhaust gas.

In the engine 1, an injector 25 is provided to inject and supply fuel into a combustion chamber 16. The fuel is supplied to the injector 25 from a fuel tank (not shown). In the engine 1, furthermore, an ignition device 29 is provided to ignite air-fuel mixture made of fuel and intake air in the combustion chamber 16. The injector 25 and the ignition device 29 correspond to one example of the output adjusting unit in the present disclosure.

This engine system is provided with a high-pressure-loop exhaust gas recirculation device (an EGR device) 10. This EGR device 10 is a device configured to allow part of exhaust gas discharged from the combustion chamber 16 of the engine 1 to the exhaust passage 5 to recirculate as exhaust recirculation gas (EGR gas) into the combustion chamber 16. The EGR device 10 includes an exhaust gas recirculation passage (an EGR passage) 17 configured to allow the EGR gas to flow from the exhaust passage 5 to the intake passage 3, and an exhaust gas recirculation valve (an EGR valve) 18 provided in the EGR passage 17 to regulate the flow rate of the EGR gas in the EGR passage 17. The EGR passage 17 is provided between the exhaust passage 5 and the surge tank 3a in the intake passage 3. Specifically, an outlet 17a of the EGR passage 17 is connected to the surge tank 3a downstream of the electronic throttle device 14. An inlet 17b of the EGR passage 17 is connected to the exhaust passage 5 upstream of the catalytic converter 15.

In the EGR passage 17, an EGR cooler 20 is provided to cool the EGR gas flowing through the EGR passage 17. The EGR valve 18 is placed in the EGR passage 17 downstream of the EGR cooler 20.

(Configuration of EGR Valve)

Figure 2:
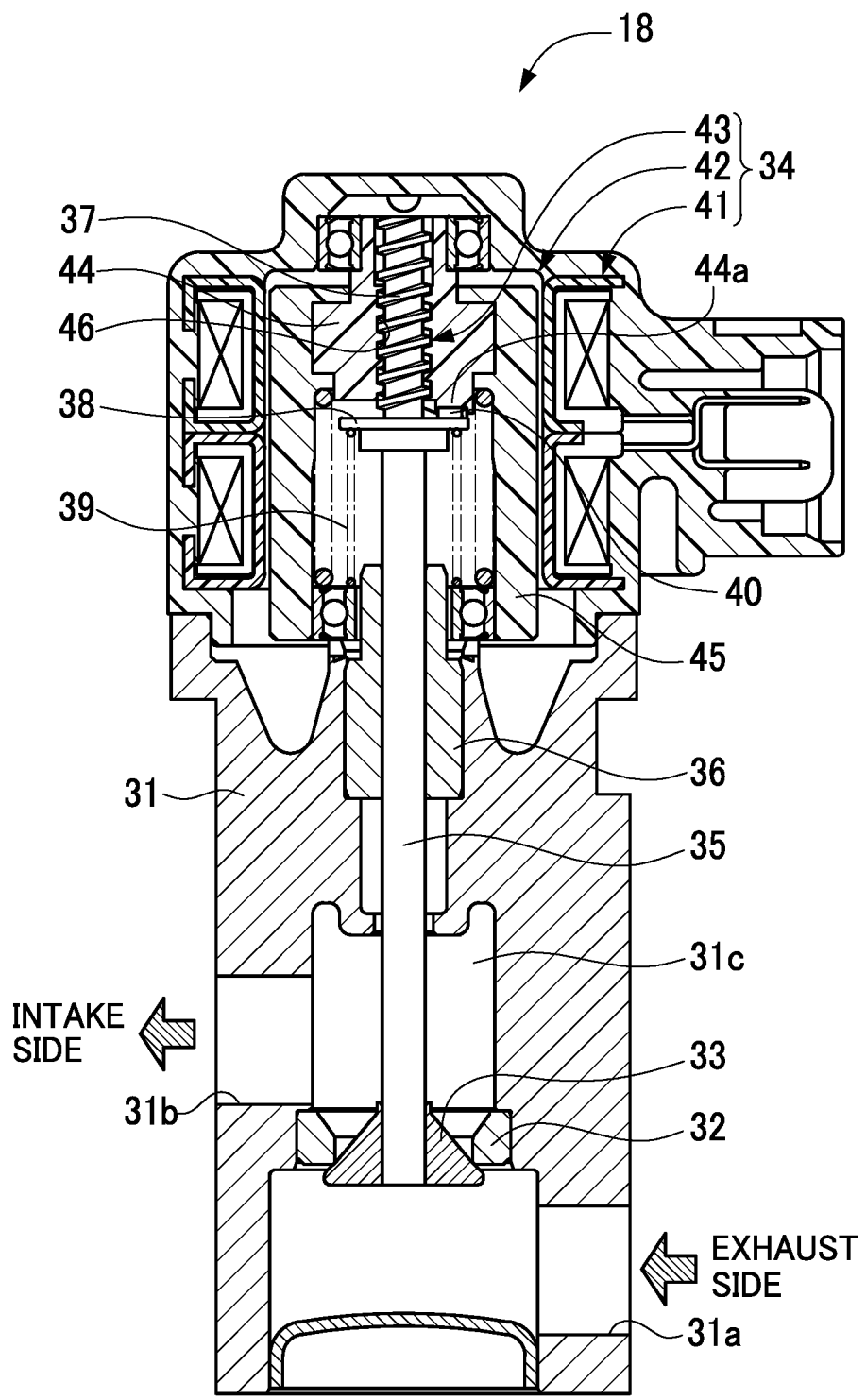
FIG. 2 is a cross-sectional view showing a configuration of an EGR valve in the embodiment.
Figure 3:
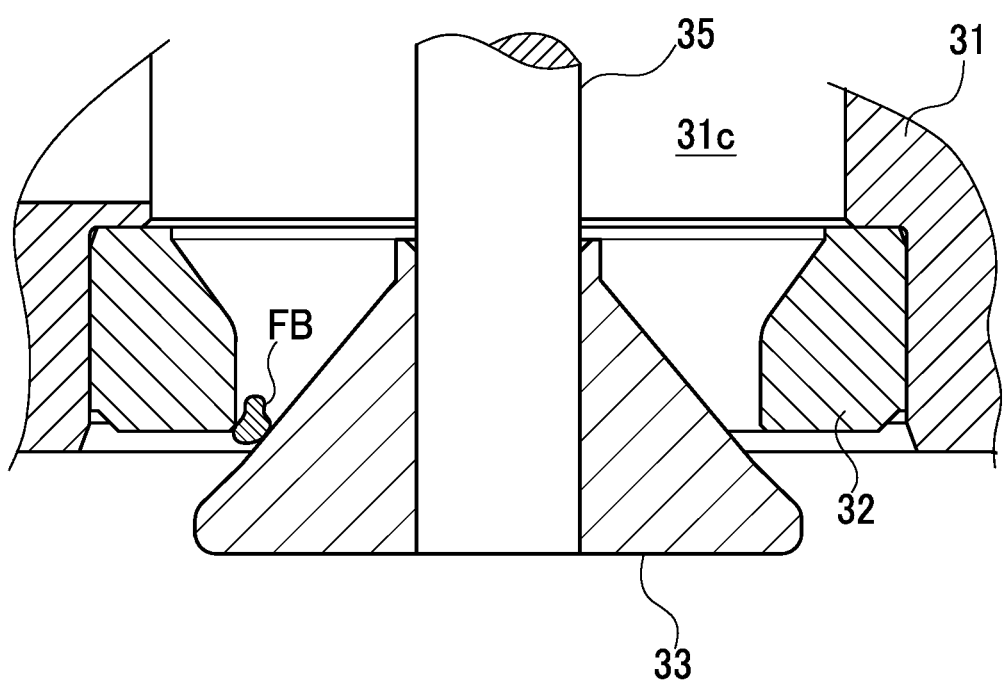
FIG. 3 is an enlarged cross-sectional view showing a part of the EGR valve in the embodiment.

FIG. 2 is a cross-sectional view showing the configuration of the EGR valve 18. FIG. 3 is an enlarged cross-sectional view showing a part of the EGR valve 18. As shown in FIG. 2, the EGR valve 18 is constituted of a motor-operated poppet valve. Specifically, the EGR valve 18 includes a housing 31, a valve seat 32 provided in the housing 31, a valve element 33 provided to be capable of seating on and moving with respect to the valve seat 32 in the housing 31, and a step motor 34 to perform a stroke movement of the valve element 33. The housing 31 includes an inlet port 31a through which EGR gas flows therein from a side close to the exhaust passage 5 (i.e., an exhaust side), an outlet port 31b through which EGR gas flows out to a side close to the intake passage 3 (i.e., an intake side), and a communication passage 31c to provide communication between the inlet port 31a and the outlet port 31b. The valve seat 32 is placed midway in the communication passage 31c.

The step motor 34 includes an output shaft 35 configured to perform linear reciprocation (stroke movement). The valve element 33 is fixed to a leading end of the output shaft 35. The output shaft 35 is supported to be capable of performing a stroke movement with respect to the housing 31 through a bearing 36 provided in the housing 31. The output shaft 35 is formed, at its upper end, with a male thread part 37. The output shaft 35 is further provided, at its midpoint (near the lower end of the male thread part 37), with a spring rest 38. This spring rest 38 has a lower surface serving as a receiving face for a compression spring 39 and an upper surface with a stopper 40 formed thereon.

The valve element 33 has a conical shape with a conical surface configured to contact with or separate from the valve seat 32. When the valve element 33 contacts with the valve seat 32, the valve element 33 is fully closed. When the valve element 33 separates from the valve seat 32, the valve element 33 is opened. The valve element 33 is urged by the compression spring 39 placed between the spring rest 38 and the housing 31 toward the step motor 34, that is, in a valve closing direction to seat on the valve seat 32. By the stroke movement of the output shaft 35 of the step motor 34, the valve element 33 in a fully-closed state is moved against the urging force of the compression spring 39, thus separating from the valve seat 32, that is, establishing a valve-open state. During this valve opening, the valve element 33 is moved toward an upstream side (the exhaust side) of the EGR passage 17. In this EGR valve 18, as above, the valve element 33 is moved from the fully-closed state in which the valve element 33 seats on the valve seat 32 toward the upstream side of the EGR passage 17 against the exhaust pressure or the intake pressure of the engine 1, so that the valve element 33 separates from the valve seat 32 into a valve-open state. On the other hand, the valve element 33 is moved from the valve-open state in the urging direction of the compression spring 39 by the output shaft 35 of the step motor 34, so that the valve element 33 comes near the valve seat 32 and then comes into a valve-closed state. During this valve closing, the valve element 33 is moved toward a downstream side (the intake side) of the EGR passage 17.

In the present embodiment, the output shaft 35 of the step motor 34 is caused to perform a stroke movement to adjust the opening degree of the valve element 33 with respect to the valve seat 32. The output shaft 35 of the EGR valve 18 is provided to be capable of performing a stroke movement by a predetermined stroke from the fully-closed state in which the valve element 33 seats on the valve seat 32 to the fully-open state in which the valve element 33 is most apart from the valve seat 32.

The step motor 34 includes a coil 41, a magnet rotor 42, and a conversion mechanism 43. The step motor 34 is configured such that the magnet rotor 42 is rotated by the predetermined number of motor steps when the coil 41 is excited by energization, thereby causing the conversion mechanism 43 to convert the rotational movement of the magnet rotor 42 to the stroke movement of the output shaft 35. Along with this stroke movement of the output shaft 35, the valve element 33 also makes a stroke movement with respect to the valve seat 32.

The magnet rotor 42 includes a rotor body 44 made of resin and a ring-shaped plastic magnet 45. The rotor body 44 is formed, at its center, with a female thread part 46 which is threadedly mounted on the male thread part 37 of the output shaft 35. When the rotor body 44 is rotated while the female thread part 46 of the rotor body 44 screws together with the male thread part 37 of the output shaft 35, the rotational movement of the rotor body 44 is converted into the stroke movement of the output shaft 35. Herein, the male thread part 37 and the female thread part 46 constitute the foregoing conversion mechanism 43. The rotor body 44 is formed, on its lower end, with a contact part 44a with which the stopper 40 of the spring rest 38 can abut. During full-closing of the EGR valve 18, the end face of the stopper 40 comes in surface contact with the end face of the contact part 44a to restrict an initial position of the output shaft 35.

In the present embodiment, the number of motor steps of the step motor 34 is changed in stages to thereby adjust the opening degree of the valve element 33 of the EGR valve 18, minutely step by step, from the fully-closed state to the fully-open state.

(Electric Configuration of Engine System)

The engine system in the present embodiment includes an electric control unit (ECU) 50 responsible for various controls as shown in FIG. 1. The ECU 50 is configured to control the injector 25, the ignition device 29, the electronic throttle device 14 (the DC motor 22), and the EGR valve 18 (the step motor 34) according to the operating state of the engine 1. The ECU 50 is further configured to output predetermined command signals to the DC motor 22 and the step motor 34 to respectively control the EGR valve 18 and the electronic throttle device 14. The ECU 50 includes a central processing unit (CPU), various memories for storing in advance predetermined control programs and others and temporarily storing calculation results of the CPU and others, and an external input circuit and an external output circuit connected to those unit and memories. The ECU 50 corresponds to one example of a controller in the present disclosure. The external output circuit is connected to the injector 25, the ignition device 29, the electronic throttle device 14 (the DC motor 22), and the EGR valve 18 (the step motor 34). The external input circuit is connected to the throttle sensor 23 and additionally various sensors 27 and 51 to 55 to detect the operating state of the engine 1. The various sensors 23, 27, and 51 to 55 correspond to one example of an operating-state detecting unit in the present disclosure.

Herein, as the various sensors, there are provided the throttle sensor 23 and additionally an accelerator sensor 27, an intake pressure sensor 51, a rotation number sensor 52, a water temperature sensor 53, an airflow meter 54, and an air-fuel ratio sensor 55. The accelerator sensor 27 is configured to detect an operation amount of the accelerator pedal 26 as an accelerator opening degree ACC and output a detection signal representative thereof. The intake pressure sensor 51 is configured to detect the pressure in the surge tank 3a located downstream of the electronic throttle device 14 as an intake pressure PM and output a detection signal representative thereof. The intake pressure sensor 51 corresponds to one example of an intake pressure detecting unit. The rotation number sensor 52 is configured to detect a rotation angle (i.e., a crank angle) of a crank shaft 1a of the engine 1 and detect a change in crank angle (i.e., a crank angular velocity) as the number of rotations of the engine 1 (i.e., an engine rotation number) NE, and output a detection signal representative thereof. The rotation number sensor 52 corresponds to one example of a rotation number detecting unit in the present disclosure. The water temperature sensor 53 is configured to detect the temperature of cooling water flowing through the inside of the engine 1, as a cooling water temperature THW, and output a detection signal representative thereof. The airflow peter 54 is configured to detect the intake amount Ga of intake air flowing in the intake passage 3 directly downstream of the air cleaner 6 and output a detection signal representative thereof. The air-fuel ratio sensor 55 is configured to detect an air-fuel ratio A/F of exhaust gas in the exhaust passage 3 directly upstream of the catalytic converter 15 and output a detection signal representative thereof.

In the present embodiment, the ECU 50 is configured to control the EGR valve 18 to execute EGR control according to the operating state of the engine 1 in all operation regions of the engine 1. On the other hand, during deceleration of the engine 1, when fuel supply to the engine 1 is cut off (i.e., during deceleration fuel cut), the ECU 50 is also configured to control the EGR valve 18 to be fully closed in order to shut off a flow of EGR gas.

Herein, the EGR valve 18 may cause a problem due to lodging or adhering of a foreign-mater FB such as deposits between the valve seat 32 and the valve element 33 as shown in FIG. 3. In the present embodiment, therefore, the ECU 50 is configured to execute "Foreign-matter lodging diagnosis control" to diagnose an "abnormality in opening or closing of the EGR valve 18" including lodging of a foreign matter or substance FB between the valve seat 32 and the valve element 33. In the present embodiment, furthermore, the ECU 50 is configured to execute "Foreign-matter removal control" to remove a foreign matter FB lodged in the EGR valve 18. In the present embodiment, the ECU 50 is still further configured to execute "During-deceleration engine-stall avoidance control" to avoid engine stall and others when a foreign matter FB is lodged in the EGR valve 18 during deceleration of the engine 1.

(Foreign-Matter Lodging Diagnosis Control)

Figure 4:
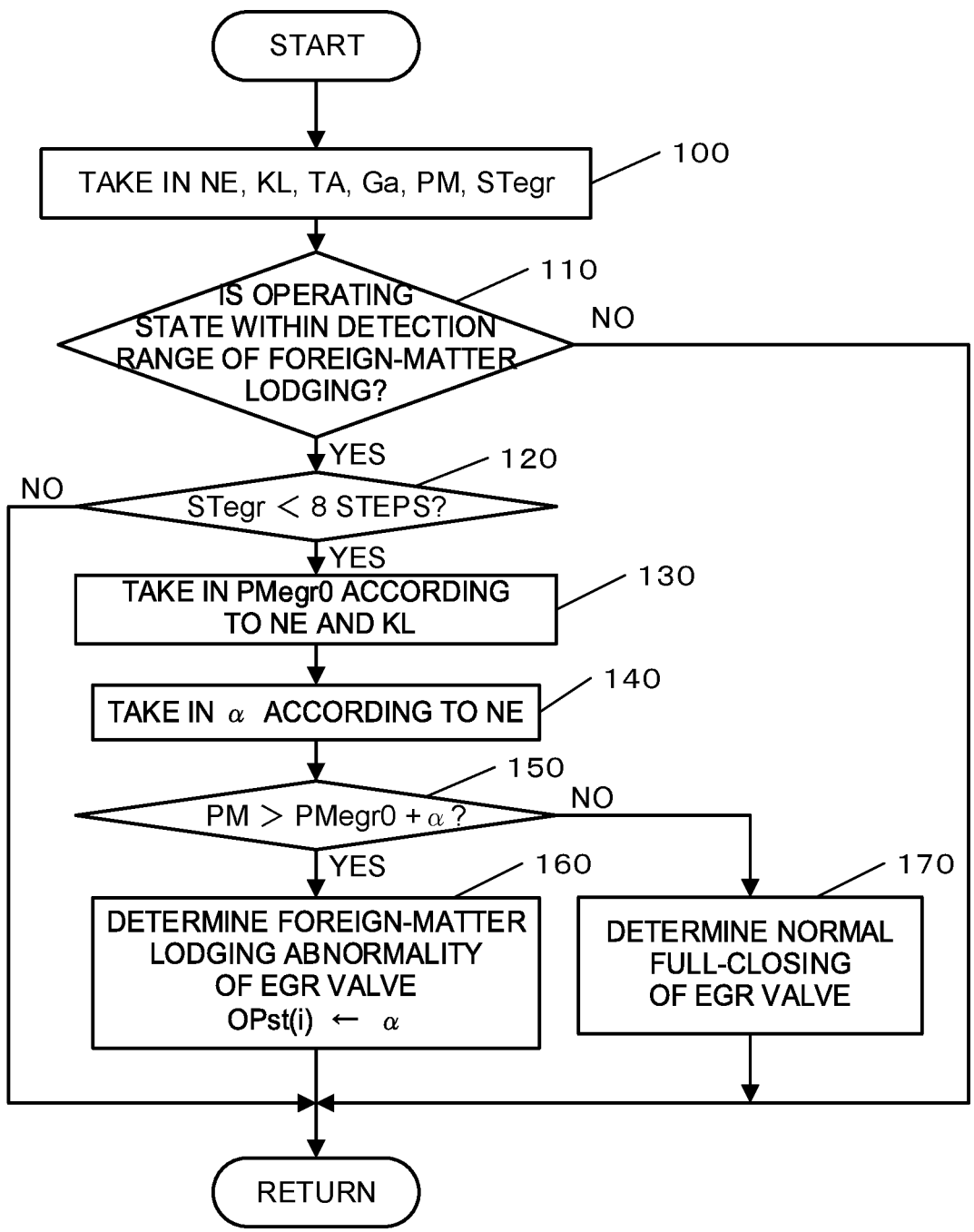
FIG. 4 is a flowchart showing details of foreign-matter lodging diagnosis control in the embodiment.

The foreign-matter lodging diagnosis control of the EGR valve 18 will be described first. FIG. 4 is a flowchart showing one example of the details of this control. This flowchart shows processing details to diagnose whether or not abnormality due to foreign-matter lodging exists in the EGR valve 18 when the engine 1 is in deceleration and the EGR valve 18 is subjected to full-closing control or valve-closing control. The ECU 50 is configured to execute this foreign-matter lodging diagnosis control in advance of other controls; the foreign-matter removal control and the during-deceleration engine-stall avoidance control.

When the processing enters this routine, in step 100, the ECU 50 first takes in various signals representing an operating state of the engine 1 from various sensors and others 23, 51, 52, and 54. Specifically, the ECU 50 takes in each of the engine rotation number NE, an engine load KL, the throttle opening degree TA, the intake amount Ga and the intake pressure PM, and the number of motor steps (i.e., a motor step number) STegr of the step motor 34 corresponding to the opening degree of the EGR valve 18. Herein, the ECU 50 can obtain the engine load KL based on the throttle opening degree TA or the intake pressure PM. Further, the motor step number STegr has a proportional relation to the opening degree of the EGR valve 18 (i.e., an EGR opening degree), that is, the opening degree of the valve element 33 relative to the valve seat 32.

In step 110, the ECU 50 determines whether or not the operating state of the engine 1 falls within the foreign-matter lodging detection range. The ECU 50 can judge for example whether or not the range defined based on the relationship between the engine rotation number NE and the engine load KL falls within a predetermined detection range appropriate for foreign-matter lodging detection. This predetermined detection range includes deceleration running or steady running of the engine 1. If this determination results in an affirmative answer (YES), the ECU 50 advances the processing to step 120. If this determination results in a negative answer (NO), the ECU 50 returns the processing to step 100.

In step 120, the ECU 50 determines whether or not the motor step number STegr is smaller than "8 steps". This value, "8 steps", is one example and corresponds to a minute opening degree of the EGR valve 18. If this determination results in YES, the ECU 50 advances the processing to step 130. If this determination results in NO, the ECU 50 returns the processing to step 100.

Figure 5:
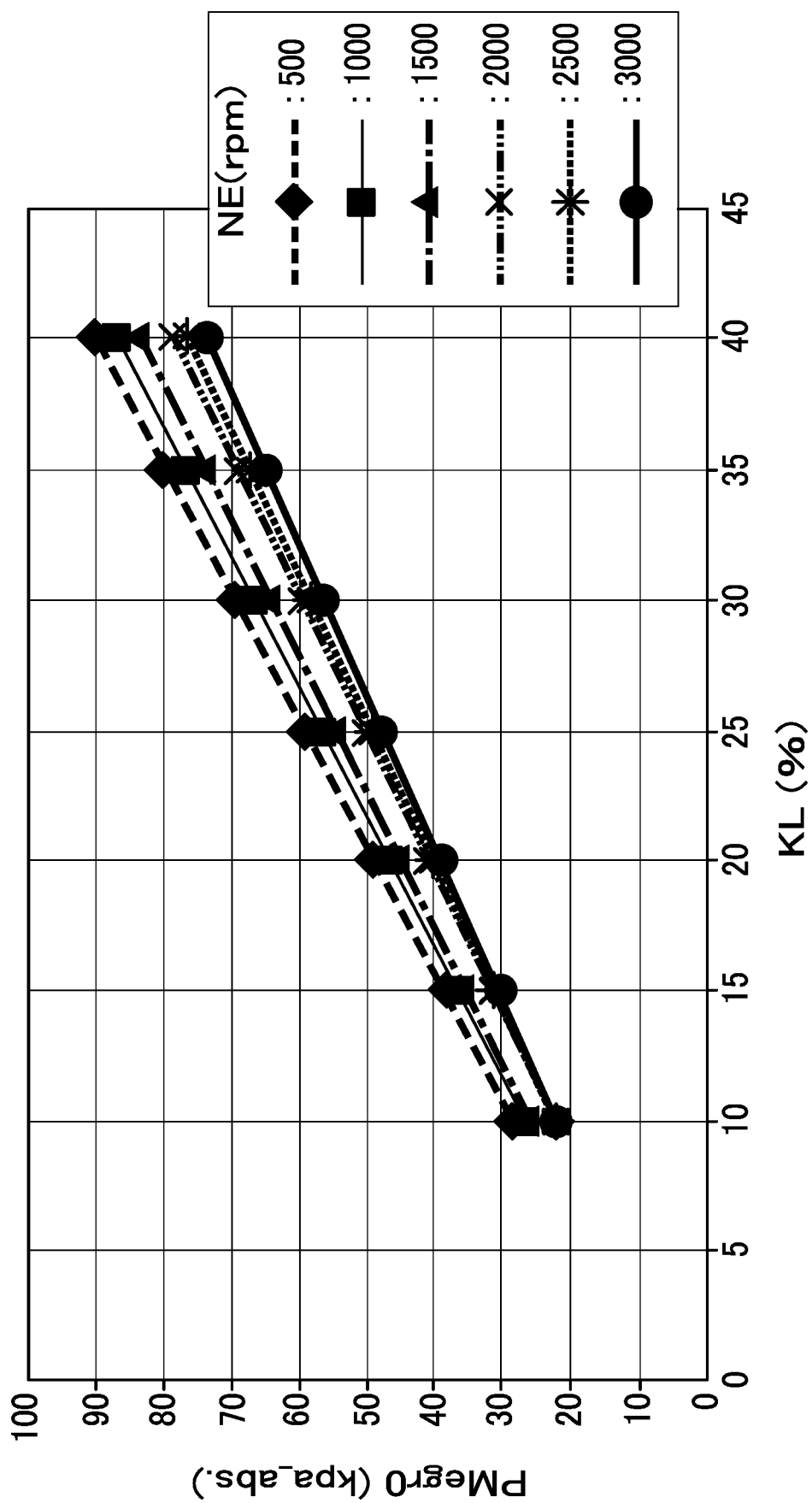
FIG. 5 is a full-closing reference intake pressure map to be referred to obtain a full-closing reference intake pressure during deceleration according to the number of engine rotations and engine load in the embodiment.

In step 130, the ECU 50 takes in a full-closing reference intake pressure PMegr0 during deceleration according to the engine rotation number NE and the engine load KL. The ECU 50 can obtain this during-deceleration full-closing reference intake pressure PMegr0 according to the engine rotation number NE and the engine load KL by for example referring to a full-closing reference intake pressure map set in advance as shown in FIG. 5. This full-closing reference intake pressure map is a map previously set to define the relationship of the full-closing reference intake pressure PMegr0 to the engine rotation number NE and the engine load KL when the opening degree of the valve element 33 of the EGR valve 18 (i.e., the EGR opening degree) is 0, that is, during full closing. Herein, the intake pressure PM during deceleration of the engine 1 generally intercorrelates with the engine load KL irrespective of the presence or absence of a foreign matter lodged in the EGR valve 18. The intake pressure PM and the engine load KL are almost proportional to each other. However, the intake pressure PM changes according to the engine rotation number NE. In FIG. 5, therefore, the full-closing reference intake pressure PMegr0 is set with respect to the engine rotation number NE and the engine load KL. This full-closing reference intake pressure PMegr0 corresponds to one example of an estimated value of intake pressure in the present disclosure. It will be understood that this estimated value may be any value calculated by a predetermined model formula or obtained by reference to a previously set map.

In step 140, subsequently, the ECU 50 takes in a pressure-increase allowance α according to the engine rotation number NE. The ECU 50 can obtain this pressure-increase allowance α by referring to a predetermined map set in advance. This pressure-increase allowance α is added to the full-closing reference intake pressure PMegr0 to permit errors or the like in the determination mentioned later.

In step 150, the ECU 50 then determines whether or not the detected intake pressure PM (i.e., an actual measured is larger than a result value obtained by adding up the hill-closing reference intake pressure PMegr0 which is an estimated value and the pressure-increase allowance α. If this determination results in YES, the ECU 50 advances the processing to step 160. If this determination results in NO, the ECU 50 shifts the processing to step 170.

In step 160, the ECU 50 determines that the EGR valve 18 is abnormal because of foreign-matter lodging (Foreign-matter lodging abnormality) and stores this determination result in a memory. Further, the ECU 50 has stored a map showing a relationship between the diameter of a lodged foreign matter and the pressure increase allowance α that changes with the foreign-matter diameter. In step 160, the ECU 50 executes the abnormality determination of foreign-matter lodging and obtains the lodged foreign-matter diameter OPst(i) corresponding to the pressure increase allowance α taken in step 150 by referring to the stored map, and stores the obtained lodged foreign-matter diameter OPst(i) in the memory. Thereafter, the ECU 50 returns the processing to step 100. The lodged foreign-matter diameter OPst(i) corresponds to one example of the level of abnormality in the present disclosure.

On the other hand, in step 170, the ECU 50 determines that the EGR valve 18 has been normally placed in a fully-closed state (Normally full-closing) and returns the processing to step 100.

According to the foregoing foreign-matter lodging diagnosis control, the ECU 50 is configured to diagnose the abnormality in opening/closing between the valve seat 32 and the valve element 33 in the EGR valve 18 (i.e., the foreign-matter lodging abnormality) and the level of abnormality (i.e., the lodged foreign-matter diameter OPst) based on the detected operating state of the engine 1 during deceleration of the engine 1. More specifically, the ECU 50 calculates the actual measured value of intake pressure (the intake pressure PM) and the estimated value (the full-closing reference intake pressure PMegr0) based on the detected intake pressure PM and engine rotation number NE, and diagnoses the abnormality (the foreign-matter lodging abnormality) and the abnormality level (the lodged foreign-matter diameter OPst) of the EGR valve 18 based on a difference between the actual measured value (the intake pressure PM) and the estimated value (the full-closing reference intake pressure PMegr0).

According to this foreign-matter lodging diagnosis control, furthermore, when the engine 1 is in deceleration and the ECU 50 performs full-closing control or valve-closing control of the EGR valve 18, the ECU 50 obtains the full-closing reference intake pressure PMegr0 according to the EGR opening degree, the engine rotation number NE, and the engine load KL by referring to the full-closing reference intake pressure map (a reference function map). The ECU 50 is further configured to compare the full-closing reference intake pressure PMegr0 and the detected intake pressure PM to diagnose whether or not the EGR valve 18 is abnormal in opening/closing.

(Foreign-Matter Removal Control of EGR Valve)

Figure 6:
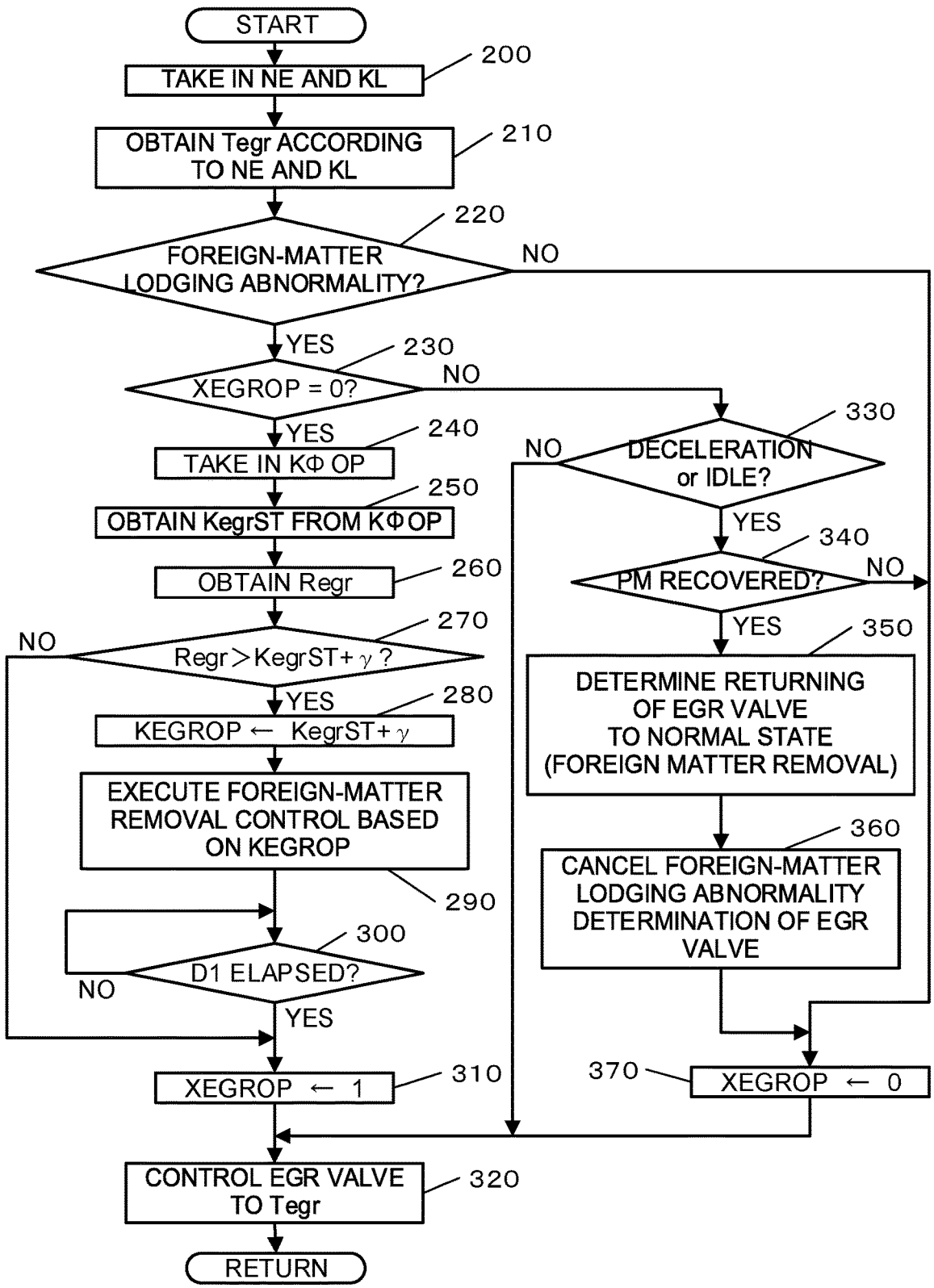
FIG. 6 is a flowchart showing details of foreign-matter removal control in the embodiment.

The following description will be given to the foreign-matter removal control of the EGR valve 18 to be executed in association with the foregoing foreign-matter lodging diagnosis control. FIG. 6 is a flowchart showing one example of the details of the control.

When the processing enters this routine, in step 200, the ECU 50 takes in the engine rotation number NE and the engine load KL respectively based on detection values of the rotation number sensor 52 and the throttle sensor 23 and others.

In step 210, successively, the ECU 50 obtains a target EGR opening degree Tegr of the EGR valve 18 according to the engine rotation number NE and the engine load KL. The ECU 50 can obtain this target EGR opening degree Tegr according to the engine rotation number NE and the engine load KL for example by referring to a predetermined target EGR opening degree map.

In step 220, the ECU 50 then determines whether or not the EGR valve 18 is abnormal because of a foreign matter lodged therein. The ECU 50 can make this determination based on a determination result of the foregoing EGR valve foreign-matter lodging diagnosis control. If this determination results in YES, the ECU 50 advances the processing to step 230. If this determination results in NO, the ECU 50 shifts the processing to step 370.

In step 230, the ECU 50 determines whether or not a foreign-matter removal flag XEGROP is 0. This flag XEGROP is set to 1 when the control of removing a foreign matter lodged in the EGR valve 18 (i.e., Foreign-matter removal control) is executed. If this determination results in YES, the ECU 50 advances the processing to step 240. If this determination results in NO, the ECU 50 shifts the processing to step 330.

In step 240, the ECU 50 takes in a foreign-matter diameter equivalent ratio KΦOP. The ECU 50 can obtain this foreign-matter diameter equivalent ratio KΦOP by dividing the intake pressure PM detected during the foreign-matter lodging determination by an intake pressure in a normal state (i.e., the full-closing reference intake pressure PMegr0 obtained based on the relationship between the engine rotation number NE and the engine load KL).

In step 250, the ECU 50 subsequently obtains an EGR opening degree KegrST equivalent to a foreign-matter diameter (i.e., a foreign-matter diameter equivalent opening degree) based on the foreign-matter diameter equivalent ratio KΦOP. The ECU 50 can obtain this foreign-matter diameter equivalent opening degree KegrST according to the foreign-matter diameter equivalent ratio KΦOP for example by referring to a predetermined foreign-matter diameter equivalent opening degree map.

In step 260, the ECU 50 then obtains an actual EGR opening degree (an actual EGR opening degree) Regr of the EGR valve 18. The ECU 50 can obtain this actual EOR opening degree Regr corresponding to the motor step number STegr of the step motor 34 for example by referring to a predetermined actual EGR opening degree map.

In step 270, the ECU 50 determines whether or not the actual EGR opening degree Regr is larger than a result value obtained by adding a predetermined value γ to the foreign-matter diameter equivalent opening degree KegrST. This predetermined value γ is a constant value to be added to control the EGR valve 18 to an opening degree larger than the foreign-matter diameter equivalent opening degree KegrST. If this determination results in YES, the ECU 50 advances the processing to step 280. If this determination results in NO, the ECU 50 shifts the processing to step 310.

In step 280, the ECU 50 sets the result value obtained by adding the predetermined value γ to the foreign-matter diameter equivalent opening degree KegrST, as a foreign-matter removal opening degree KEGROP for removal of a foreign matter FB from the EGR valve 18.

In step 290, the ECU 50 then executes the foreign-matter removal control based on the foreign-matter removal opening degree KEGROP. Specifically, the ECU 50 controls the EGR valve 18 from the actual EGR opening degree Regr to the foreign-matter removal opening degree KEGROP. In this case, when a foreign matter FB is lodged between the valve seat 32 and the valve element 33, such a lodging situation is released, so that the foreign matter FB is peeled off or blown away from the valve seat 32 or the valve element 33 by a stream of EGR gas in the EGR passage 17.

In step 300, subsequently, the ECU 50 waits until a predetermined time D1 elapses and then shifts the processing to step 310.

In step 310 following step 270 or step 300, the ECU 50 sets the foreign-matter removal flag XEGROP to 1.

In step 320, thereafter, the ECU 50 controls the EGR valve 18 to the target EGR opening degree Tegr and returns the processing to step 200.

On the other hand, in step 370 following step 220, the ECU 50 sets the foreign-matter removal flag XEGROP to 0 and shifts the processing to step 320.

In step 330 following step 230, the ECU 50 determines whether the operation of the engine 1 is deceleration or idle. The ECU 50 can make this determination for example based on the throttle opening degree TA and the engine rotation number NE. If this determination results in YES, the ECU 50 advances the processing to step 340. If this determination results in NO, the ECU 50 shifts the processing to step 320.

In step 340, the ECU 50 further determines whether or not the intake pressure PM has recovered to the intake pressure in a normal state (i.e., the full-closing reference intake pressure PMegr0 that can be obtained from the relationship between the engine rotation number NE and the engine load KL). If this determination results in YES, the ECU 50 advances the processing to step 350. If this determination results in NO, the ECU 50 shifts the processing to step 370.

In step 350, the ECU 350 determines that the EGR valve 18 has restored to a normal state because of removal of the foreign matter. The ECU 50 can store this determination result in the memory.

In step 360, the ECU 50 cancels the determination of the foreign-matter lodging abnormality of the EGR valve 18 and advances the processing to step 370. The ECU 50 can delete for example the foreign-matter lodging abnormality determination stored in the memory.

According to the foregoing foreign-matter removal control, the ECU 50 is configured such that, when it is determined that foreign-matter lodging abnormality exists in the EGR valve 18, the ECU 50 obtains the opening degree equivalent to the diameter of a foreign matter FB lodged between the valve seat 32 and the valve element 33 (i.e., the foreign-matter diameter equivalent opening degree KegrST) based on the detected intake pressure PM and the obtained full-closing reference intake pressure PMegr0 and controls the step motor 34 to open the valve element 33 at an opening degree (i.e., the foreign-matter removal opening degree KEGROP) larger than the obtained opening degree (i.e., the foreign-matter diameter equivalent opening degree KegrST) in order to remove the foreign matter FIB from between the valve seat 32 and the valve element 33.

(During-Deceleration Engine-Stall Avoidance Control)

Figure 7:
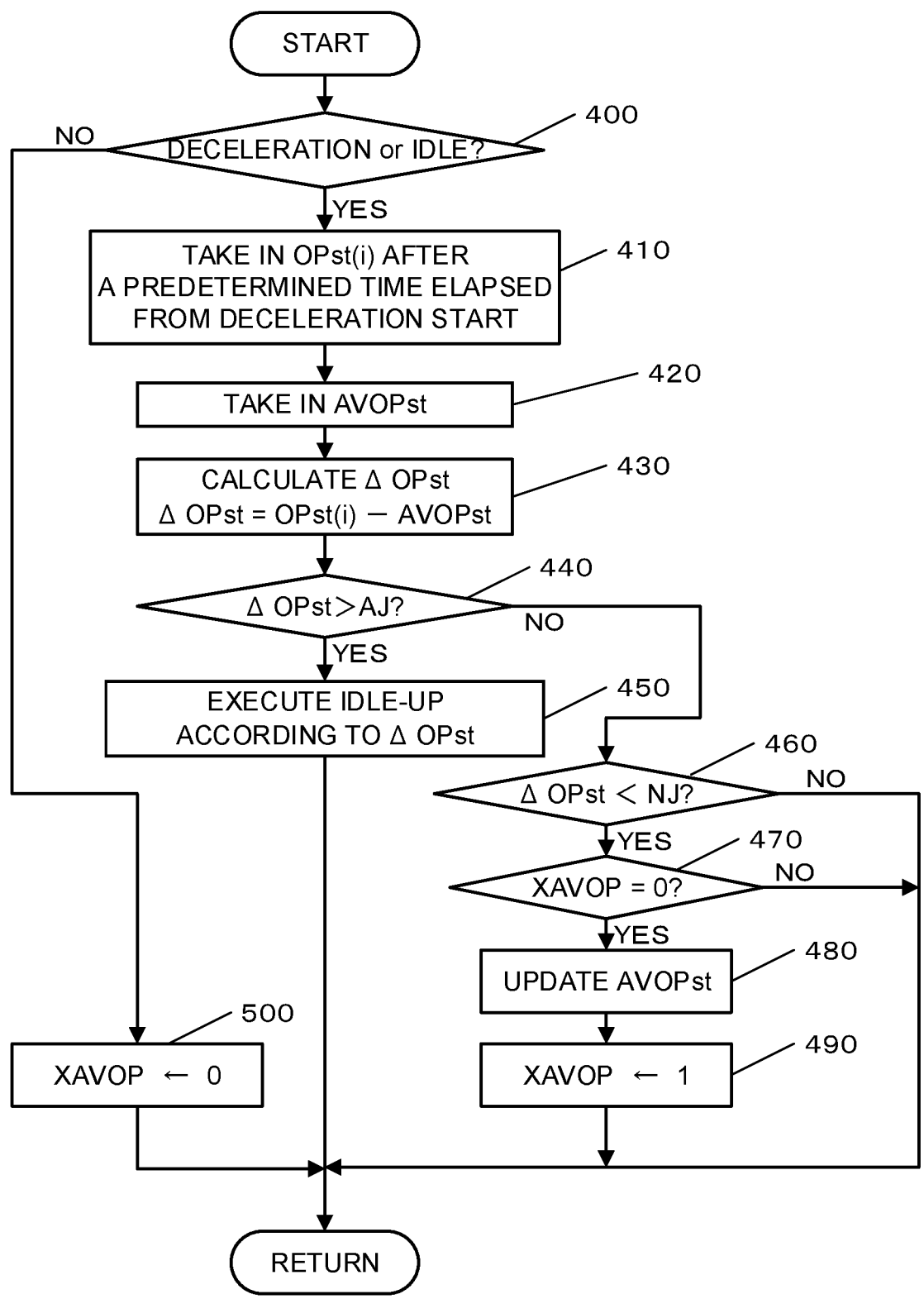
FIG. 7 is a flowchart showing details of during-deceleration engine-stall avoidance control in the embodiment.

The following description is given to the during-deceleration engine-stall avoidance control to be executed in relation to the foregoing foreign-matter lodging diagnosis control. FIG. 7 is a flowchart showing one example of the details of this control. During deceleration of the engine 1, if the EGR valve 18 is not fully closed due to a foreign matter FB lodged therein or other causes even when the EGR valve 18 has been subjected to full-closing control, EGR gas may leak to flow into the engine 1, thereby causing misfire and engine stall of the engine 1. In the present embodiment, therefore, this during-deceleration engine-stall avoidance control is executed in relation to and subsequent to the foregoing foreign-matter lodging diagnosis control.

When the processing enters this routine, in step 400, the ECU 500 determines whether or not the engine 1 runs in deceleration mode or in idle mode. The ECU 50 can make this determination for example based on the throttle opening degree TA and the engine rotation number NE. If this determination results in YES, the ECU 50 advances the processing to step 410. If this determination results in NO, the ECU 50 advances the processing to step 500.

Figure 9:
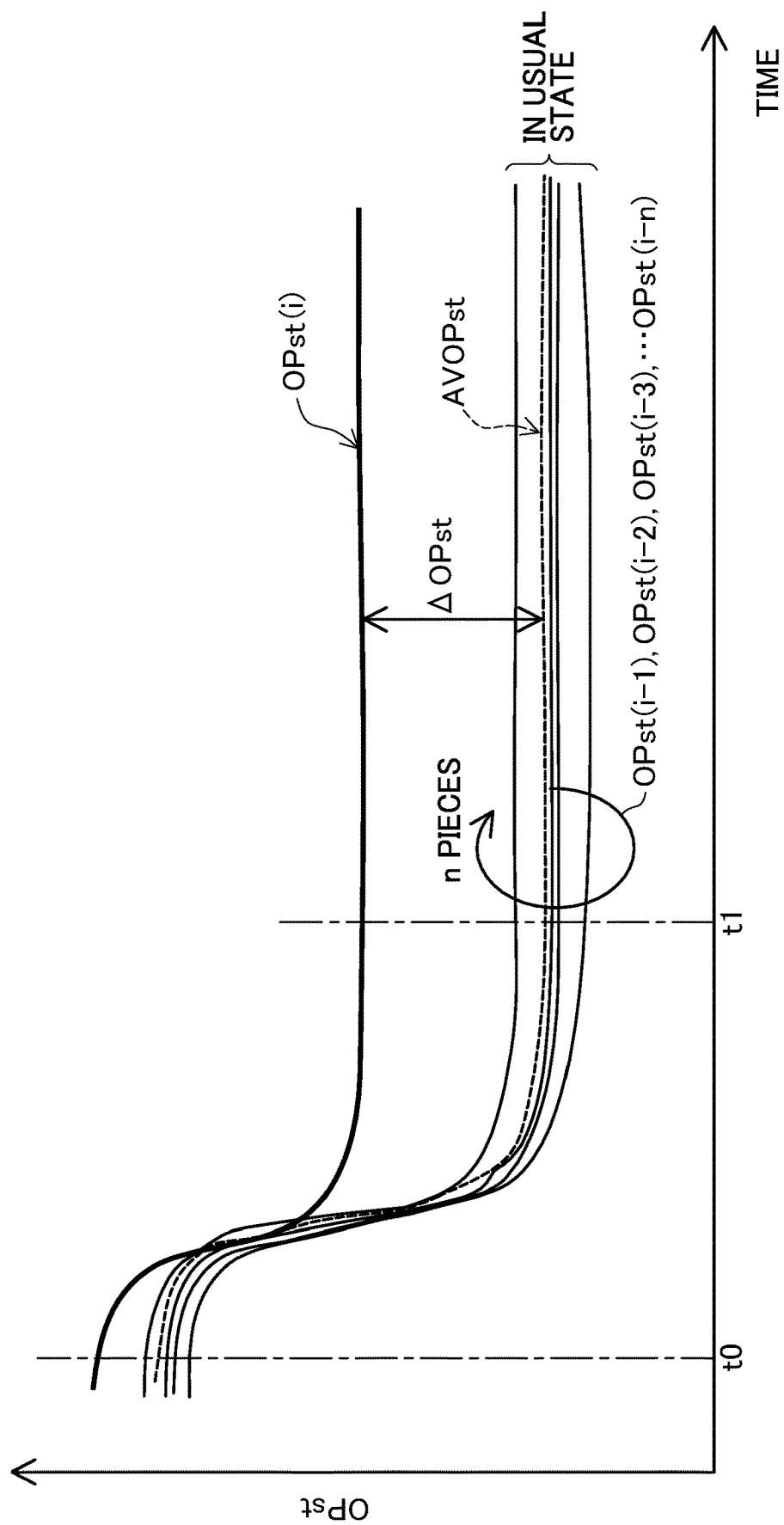
FIG. 9 is a graph showing a relationship between lodged foreign-matter diameter detected from deceleration start, average lodged foreign-matter diameter, and lodged foreign-matter diameter difference in the embodiment.

In step 410, the ECU 50 takes in the lodged foreign-matter diameter OPst(i) stored in the foreign-matter lodging diagnosis control, the lodged foreign-matter diameter OPst(i) having been stored after a lapse of a predetermined time (time t1 in FIG. 9) from deceleration start (time t0 in FIG. 9).

In step 420, subsequently, the ECU 50 takes in an average lodged foreign-matter diameter AVOPst (mentioned later). This average lodged foreign-matter diameter AVOPst corresponds to one example of a learning determination value in the present disclosure.

In step 430, the ECU 50 then calculates a lodged foreign-matter diameter difference ΔOPst. The ECU 50 can obtain this lodged foreign-matter diameter difference ΔOPst by subtracting the average lodged foreign-matter diameter AVOPst from the lodged foreign-matter diameter OPst(i) taken this time. This lodged foreign-matter diameter difference ΔOPst corresponds to one example of an abnormality level difference in the present disclosure.

In step 440, the ECU 50 further determines whether or not the lodged foreign-matter diameter difference ΔOPst is larger than a predetermined abnormality determination value AJ. If this determination results in YES, indicating that the leakage amount of EGR gas is large, which may cause misfire Which leads to engine stall, the ECU 50 advances the processing to step 450. If this determination results in NO, indicating that the leakage amount of EGR gas is small, which is less likely to cause misfire leading to engine stall, the ECU 50 returns the processing to step 460.

Figure 8:
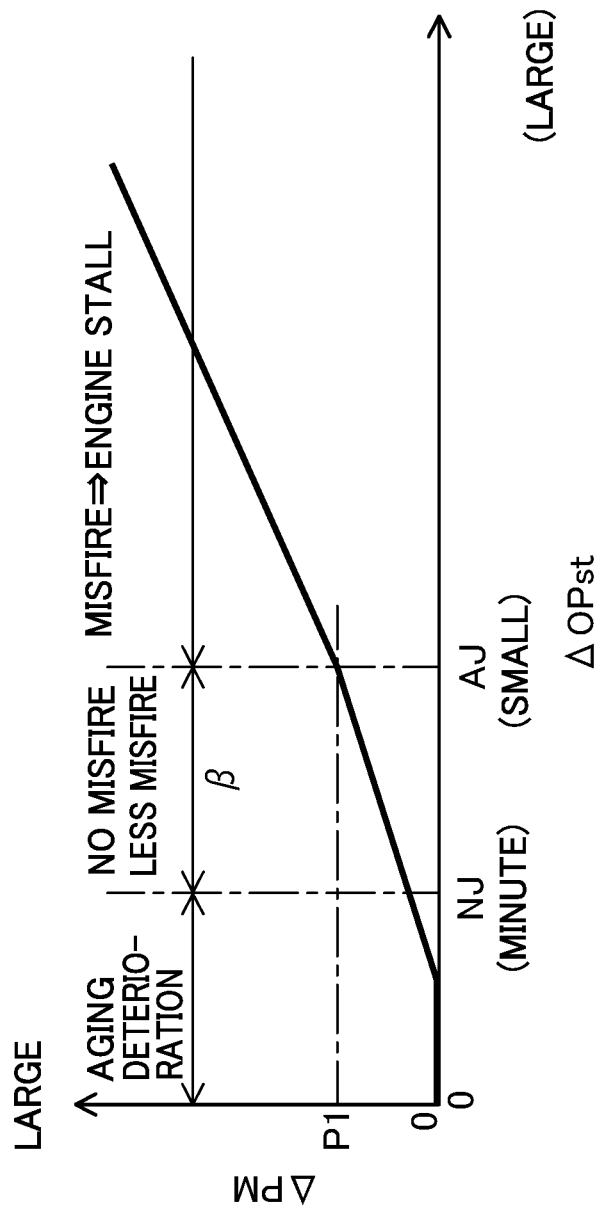
FIG. 8 is a graph showing a relationship of intake pressure change to lodged foreign-matter diameter difference in the embodiment.

Herein, the abnormality determination value AJ is a value used to determine Whether or not the lodged foreign-matter diameter difference ΔOPst is likely to cause misfire leading to engine stall. If the lodged foreign-matter diameter difference ΔOPst is larger than the abnormality determination value AJ, as shown in FIG. 8, a change ΔPM in intake pressure PM (i.e., an intake pressure change) is larger than a predetermined value P1 by the EGR gas leaking to flow in the EGR valve 18, which may cause misfire leading to engine stall. Furthermore, if the lodged foreign-matter diameter difference ΔOPst is equal to or less than the abnormality determination value AJ and equal to or larger than a predetermined normality determination value NJ (NJ=AJ−β) that is smaller by a predetermined value than the abnormality determination value AJ, no misfire or less misfire occurs. In addition, when the lodged foreign-matter diameter difference ΔOPst is less than the normality determination value NJ, the intake pressure change ΔPM becomes a minute level corresponding to aging deterioration. FIG. 8 is a graph showing the relationship of the intake pressure change ΔPM to the lodged foreign-matter diameter difference ΔOP.

In step 450, the ECU 50 executes idle-up according to the lodged foreign-matter diameter difference ΔOPst to avoid engine stall. Specifically, the ECU 50 obtains a target idle-up opening degree according to the lodged foreign-matter diameter difference ΔOP and controls the electronic throttle device 14 based on the opening degree. The ECU 50 then returns the processing to step 400.

On the other hand, in step 460 following step 440, the ECU 50 determines whether or not the lodged foreign-matter diameter difference ΔOPst is smaller than the predetermined normality determination value NJ. If this determination results in YES, the ECU 50 advances the processing to step 470. If this determination results in NO, the ECU 50 returns the processing to step 400.

In step 470, the ECU 50 determines whether or not an average value updating flag XAVOP is 0. This flag XAVOP is set to 1 when an average lodged foreign-matter diameter AVOPst is updated as mentioned later. If this determination results in YES, indicating non-updating, the ECU 50 advances the processing to step 480. If this determination results in NO, the ECU 50 returns the processing to step 400.

In step 480, the ECU 50 updates the average lodged foreign-matter diameter AVOPst. Specifically, the ECU 50 obtains an average value of n-pieces of lodged foreign-matter diameters (i.e., actual EGR opening degrees) OPst(i-1), OPst(i-2), OPst(i-3), . . . , and OPst(i-n) determined in a usual state (i.e., in a state where no foreign matter is lodged in the EGR valve 18), which have been taken before this time.

Herein, FIG. 9 is a graph showing the relationship between the lodged foreign-matter diameter OPst, the average lodged foreign-matter diameter AVOPst, and the lodged foreign-matter diameter difference ΔOPst, which are obtained from the deceleration start (time t0). As shown in FIG. 9, the lodged foreign-matter diameters OPst(i-1), OPst(i-2), OPst(i-3), . . . , and OPst(i-n) taken in the usual state vary slightly but not widely from one another. Therefore, an average value of those lodged foreign-matter diameters OPst(i-1), OPst(i-2), OPst(i-3), . . . , and OPst(i-n) taken in the usual state is updated sequentially and learnt, so that the average lodged foreign-matter diameter AVOPst reflecting the environment, individual differences, and aging deterioration is obtained. Thus, a difference of the average lodged foreign-matter diameter AVOPst from the lodged foreign-matter diameter OPst(i) taken each time is the lodged foreign-matter diameter difference ΔOPst.

In step 490, the ECU 50 sets the average value updating flag XAVOP to 1 and returns the processing to step 400.

On the other hand, in step 500 following step 400, the ECU 50 sets the average value updating flag XAVOP to 0 and returns the processing to step 400.

According to the foregoing during-deceleration engine-stall avoidance control, when existence of the abnormality in the EGR valve 18 (foreign-matter lodging abnormality and others) and the abnormality level (the lodged foreign-matter diameter OPst) are determined, the ECU 50 calculates a difference between the abnormality level (the lodged foreign-matter diameter OPst) and a predetermined learning determination value (the average lodged foreign-matter diameter AVOPst) as an abnormality level difference (the lodged foreign-matter diameter difference ΔOPst). If the abnormality level difference (the lodged foreign-matter diameter difference ΔOPst) is larger than the predetermined determination value AJ, the ECU 50 judges that the abnormality level (the lodged foreign-matter diameter OPst) is excessive and controls an output adjusting unit (e.g., the electronic throttle device 14 in the present embodiment) to avoid engine stall. If the abnormality level difference (the lodged foreign-matter diameter difference ΔOPst) is equal to or larger than the predetermined normality determination value NJ (which is smaller than the abnormality determination value AJ) and also equal to or less than the abnormality determination value AJ, the ECU 50 continues deceleration of the engine 1. If the abnormality level difference (the lodged foreign-matter diameter difference ΔOPst) is less than the predetermined normality determination value NJ, the ECU 50 judges the abnormality level (the lodged foreign-matter diameter OPst) is minute and updates the learning determination value (the average lodged foreign-matter diameter AVOPst). Herein, the ECU 50 updates *the learning determination value (the average lodged foreign-matter diameter AVOPst) with an average value of a plurality of values representing the abnormality levels (the lodged foreign-matter diameters OPst(i-1), OPst(i-2), OPst(i-3), . . . , and OPst(i-n)) that have been previously obtained.

According to the foregoing during-deceleration engine stall avoidance control, furthermore, the ECU 50 executes idle-up according to the learning determination value (the average lodged foreign-matter diameter AVOPst) as the control of avoiding engine stall, (Operations and Effects of Engine System)

According to the engine system in the present embodiment described above, during deceleration of the engine 1, based on the detected operating state, the abnormality in opening/closing between the valve seat 32 and the valve element 33 in the EGR valve 18 (the foreign-matter lodging abnormality and others) and the lodged foreign-matter diameter OPst(i) thereof (the abnormality level) are diagnosed. In the present embodiment, parameters of an operating state for such diagnosis are specified as the intake pressure PM and the engine rotation number NE. If the existence of the abnormality in the EGR valve 18 and the lodged foreign-matter diameter OPst(i) are determined, a difference between the lodged foreign-matter diameter OPst(i) and the average lodged foreign-matter diameter AVOPst (the learning determination value) is calculated as the lodged foreign-matter diameter difference ΔOPst (the abnormality level difference). Herein, if the lodged foreign-matter diameter difference ΔOPst is larger than the predetermined abnormality determination value AJ, the lodged foreign-matter diameter OPst(i) is judged to be excessive and thus the electronic throttle device 14 is controlled to avoid engine stall. If the abnormality level difference is equal to or larger than the normality determination value NJ (which is smaller than the abnormality determination value AJ) and also equal to or less than the abnormality determination value AJ, deceleration of the engine 1 is continued. Furthermore, if the lodged foreign-matter diameter difference ΔOPst is less than the normality determination value NJ, the lodged foreign-matter diameter OPst(i) is judged to be minute and thus the average lodged foreign-matter diameter AVOPst is updated. Accordingly, when the lodged foreign-matter diameter difference ΔOPst is less than the normality determination value NJ and the lodged foreign-matter diameter OPst(i) is minute, the average lodged foreign-matter diameter AVOPst to be compared with the lodged foreign-matter diameter OPst(i) is updated, so that various influences on detection results of the intake pressure sensor 51 and others are reflected in the average lodged foreign-matter diameter AVOPst. Since only when the lodged foreign-matter diameter OPst(i) is excessive, the electronic throttle device 14 is controlled to avoid engine stall and thus the number of times for controlling electronic throttle device 14 is reduced. Accordingly, irrespective of the various influences on the detection of the operating state of the engine 1, it is possible to prevent erroneous determination for the abnormality that the valve 18 could not be completely brought into a fully-closed state due to foreign-matter lodging and others and hence appropriately avoid engine stall when the abnormality occurs.

According to the configuration in the present embodiment, the average lodged foreign-matter diameter AVOPst (the learning determination value) is updated with an average value of a plurality of values OPst(i-1), OPst(i-2), OPst(i-3), . . . , and OPst(i-n) representing the previously obtained lodged foreign-matter diameter OPst(i). Thus, the influence on various detection results obtained by the intake pressure sensor 51 and others (e.g., changes in environmental conditions, individual differences of various devices, and aging deterioration of various devices) is absorbed and reflected in the average lodged foreign-matter diameter AVOPst. This can enhance diagnosis accuracy for foreign-matter lodging abnormality and others.

In the present embodiment, the abnormality in opening/closing of the EGR valve 18 is premised on the full-closing abnormality due to lodging of a foreign matter FB. However, the abnormality is not limited to the lodging of a foreign matter FB and may be promised on the abnormality that the valve element 33 cannot be fully closed due to sticking and others.

According to the configuration in the present embodiment, furthermore, when the EGR valve 18 is judged to be abnormal, the foreign-matter removal control is executed to open the valve element 33 at an opening degree larger than the opening degree corresponding to the diameter of a foreign matter FB to thereby remove the foreign matter FB lodged between the valve seat 32 and the valve element 33. Thus, the EGR valve 18 can be quickly returned from the foreign-matter lodging abnormality state to a normal state. In this regard, misfire and engine stall of the engine 1 can be prevented from occurring.

The present disclosure is not limited to the foregoing embodiments and may be embodied in other specific forms without departing from the essential characteristics thereof.

(1) In the foregoing embodiment, the electronic throttle device 14 is used as the output adjusting unit and the idle-up by the electronic throttle device 14 is performed as the control to avoid engine stall. As an alternative, the ignition device 29 may be used as the output adjusting unit and the ignition timing advance control by this ignition device 29 may be performed as the control to avoid engine stall. As another alternative, the injector 25 may be used as the output adjusting unit and the fuel amount increasing control by the injector 25 may be performed as the control to avoid engine stall.

(2) In the foregoing embodiment, the EGR device 10 is embodied as the so-called high-pressure-loop EGR device in the gasoline engine system equipped with no supercharger. As an alternative, it may be embodied as a so-called high-pressure-loop and low-pressure-loop EGR device in a gasoline engine system equipped with a supercharger.

(3) In the foregoing embodiment, the present disclosure is applied to a gasoline engine system, but may be applied to a diesel engine system.

INDUSTRIAL APPLICABILITY

The present disclosure is applicable to a gasoline engine system and a diesel engine system, each including an EGR device.

REFERENCE SIGNS LIST

1 Engine
3 Intake passage
5 Exhaust passage
10 EGR device (Exhaust gas recirculation device)
14 Electron throttle device (Output adjusting unit)
17 EGR passage (Exhaust gas recirculation passage)
18 EGR valve (Exhaust gas recirculation valve)
23 Throttle sensor (Operating-state detesting unit)
25 Injector (Output adjusting unit)
27 Accelerator sensor (Operating-state detecting unit)
29 Ignition device (Output adjusting unit)
50 ECU (Controller)
51 Intake pressure sensor (Operating-state detecting unit, Intake pressure detecting unit)
52 Rotation number sensor (Operating-state detecting unit, Rotation number detecting unit)
53 Water temperature sensor (Operating-state detecting unit)
54 Airflow meter (Operating-state detecting unit)
55 Air-fuel ratio sensor (Operating-state detecting unit)
PM Intake pressure
NE Engine rotation number
OPst(u) Lodged foreign-matter diameter (Abnormality level)
AVOPst Average lodged foreign-matter diameter (Learning determination value)
ΔOPst Lodged foreign-matter diameter difference (Abnormality level difference)
AJ Abnormality determination value
NJ Normality determination value

What is claimed is:

1. An engine system comprising:
    an engine;
    an intake passage configured to introduce intake air into the engine;
    an exhaust passage configured to discharge exhaust gas from the engine;
    an exhaust gas recirculation device including:
        an exhaust gas recirculation passage configured to allow part of the exhaust gas discharged from the engine to the exhaust passage to flow as an exhaust recirculation gas into the intake passage to recirculate into the engine; and
        an exhaust gas recirculation valve configured to regulate an amount of the exhaust recirculation gas in the exhaust gas recirculation passage, the exhaust gas recirculation valve including a valve seat and a valve element configured to seat on the valve seat;
    an output adjusting unit configured to adjust output of the engine, the output adjusting unit including an electronic throttle device provided in the intake passage, the exhaust gas recirculation passage including an inlet and an outlet, the outlet being connected to the intake passage downstream of the electronic throttle valve;
    an operating-state detecting unit configured to detect an operating state of the engine, the operating-state detecting unit including at least one sensor configured to detect a state in the intake passage; and
    a controller configured to control at least the exhaust gas recirculation valve and the output adjusting unit based on the detected state in the intake passage, the controller being configured to diagnose (i) an abnormality in opening/closing between the valve seat and the valve element in the exhaust gas recirculation valve and (ii) a level of the abnormality based on the detected state in the intake passage during idle or deceleration of the engine, wherein:
        when existence of the abnormality and the abnormality level are determined, the controller is configured to calculate a difference between the abnormality level and a predetermined learning determination value as an abnormality level difference,
        when the abnormality level difference is larger than a predetermined abnormality determination value, the controller is configured to determine that the abnormality level is excessive and control the output adjusting unit to avoid engine stall,
        when the abnormality level difference is equal to or larger than a predetermined normality determination value, which is smaller than the abnormality determination value, and the abnormality level difference is equal to or less than the abnormality determination value, the controller is configured to continue idle or deceleration of the engine, and
        when the abnormality level difference is less than the normality determination value, the controller is configured to determine that the abnormality level is minimal and update the learning determination value.

2. The engine system according to claim 1, wherein the controller is configured to update the learning determination value with an average value of a plurality of values representing a plurality of abnormality levels previously obtained.

3. The engine system according to claim 1, wherein:
    the operating-state detecting unit includes:
        an intake pressure sensor configured to detect an intake pressure of the engine, the intake pressure sensor acting as the at least one sensor configured to detect the state in the intake passage; and
        a rotation number sensor configured to detect a number of rotations of the engine, and
    the controller is configured to (i) calculate an estimated value of the intake pressure according to a predetermined relationship based on engine load and the detected number of rotations, and (ii) diagnose the abnormality in the exhaust gas recirculation valve based on a difference between the detected intake pressure and the estimated value.

* * * * *